(12) United States Patent
Jin et al.

(10) Patent No.: US 7,190,869 B2
(45) Date of Patent: Mar. 13, 2007

(54) TWO-MODE PHOTONIC CRYSTAL FIBER AND APPLICATIONS THEREOF

(75) Inventors: Wei Jin, Kowloon (HK); Jian Ju, Kowloon (HK); Zhi Wang, Kowloon (HK)

(73) Assignee: The Hong Kong Polytechnic University, Hong Kong (HK)

( * ) Notice: Subject to any disclaimer, the term of this patent is extended or adjusted under 35 U.S.C. 154(b) by 66 days.

(21) Appl. No.: 10/976,185

(22) Filed: Oct. 29, 2004

(65) Prior Publication Data

US 2006/0093296 A1 May 4, 2006

(51) Int. Cl.
*G02B 6/32* (2006.01)
(52) U.S. Cl. .................................................. 385/125
(58) Field of Classification Search ......... 385/123–128
See application file for complete search history.

(56) References Cited

U.S. PATENT DOCUMENTS

| | | | | |
|---|---|---|---|---|
| 4,832,437 | A | 5/1989 | Kim et al. ............... | 350/96 |
| 4,915,463 | A | 4/1990 | Barbee, Jr. .............. | 350/1.1 |
| 5,022,732 | A | 6/1991 | Engan et al. ............ | 350/96 |
| 6,151,427 | A | 11/2000 | Satorius .................. | 385/7 |
| 6,577,801 | B2 * | 6/2003 | Broderick et al. ....... | 385/125 |
| 6,603,912 | B2 | 8/2003 | Birks et al. ............. | 385/125 |

OTHER PUBLICATIONS

Blake et al, OPTICS LTRS, vol. 11, No. 3, Mar. 1986, pp. 177-179, Fiber-optic modal coupler using periodic microbending.
Sorin et al, OPTICS LTRS, vol. 11, No. 9, Sep. 1986, pgs. 581-583, Highly selective evanescent modal filter for two-mode optical . . . .
Kim et al, OPTICS LTRS, vol. 11, No. 6, Jun. 1986, pp. 389-391, All-fiber acousto-optic frequency shifter.
Yun et al, OPTICS LTRS, vol. 21, No. 1, Jan. 1996, All-fiber tunable filter and laser based on two-mode fiber.
Park et al, Jour of Lightwave Tech, vol. 20, No. 10, Oct. 2002, pp. 1864-1868, All-Fiber Wavelength-Tunable Acoustooptic . . . .
Kim et al, OPTICS LTRS, vol. 12, No. 9, Sep. 1987, Use of highly elliptical core fibers for two-mode fiber devices.
Vengsarkar et al, Jour of Lightwave Tech, vol. 12, No. 1, Jan. 1994 pp. 170-177, Fiber-Optic Dual-Technique Sensor for . . . .

(Continued)

*Primary Examiner*—Kevin S. Wood
(74) *Attorney, Agent, or Firm*—Jacobson Holman PLLC (57) ABSTRACT

A two-mode photonic crystal fiber includes a core of a substantially transparent core material. The core material has a core refractive index and a length, and has a core diameter. The fiber also includes a cladding region surrounding the length of core material. The cladding region has a first substantially transparent cladding material, having a first refractive index. The first substantially transparent cladding material has embedded along its length a substantially periodic array of holes, having a diameter, d, and being spaced apart by a pitch, $\Lambda$. The holes have a second refractive index, which is less than the first refractive index. The dimensions of the hole diameter, d, and the pitch, $\Lambda$, co-operate to give two modes propagation within the photonic crystal fiber independent of input radiation wavelength for any value of the pitch, $\Lambda$, for a substantially fixed $d/\Lambda$ ratio within a range of approximately 0.45–0.65.

35 Claims, 10 Drawing Sheets

OTHER PUBLICATIONS

Blake et al, OPTICS LTRS., vol. 12, No. 9, Sep. 1987, pp. 732-734 Strain effects on highly elliptical core two-mode fibers.

Huang et al, Jour of Lightwave Tech, vol. 8, No. 1, Jan. 1990, pp. 23-33, Perturbation Effects on Mode Propagation in Highly . . . .

Birks et al, OPTICS LTRS, vol. 22, No. 13, Jul. 1, 1997, pp. 961-963, Endlessly single-mode photonic crystal fiber.

Bjarklev et al, Photonic Crystal Fibres, 2003, pp. 116-123, Fabrication of Photonic Crystal Fibres.

See www.crystal-fibre.com, 2000, manufacture and marketing of photonic crystal fibers (PCFs).

Ranka et al, OPTICS LTRS, vol. 25, No. 11, Jun. 1, 2000, pp. 796-798, Optical properties of high-delta air, silica . . . .

See www.blazephotonic.com, 2003, manufacture and marketing of photonic crystal fiber products (PCF).

Hoo et al, OPT ENG 41 (1), Jan. 2002, pp. 8-9, Evanescent-wave gas sensing using microstructure fiber.

Monro et al, ELECTRONICS LTRS, vol. 35, No. 14, pp. 1188-1189, 1999, Developing holey fibers for evanescent field devices.

* cited by examiner

TWO-MODE PHOTONIC CRYSTAL FIBER AND APPLICATIONS THEREOF

BACKGROUND

1. Field of the Invention

The present invention relates generally to two-mode photonic crystal optical fiber structures and to applications thereof.

2. Background of the Invention

Two-mode optical fibers have wide applications such as mode converters, mode selective couplers, acousto-optic frequency shifters, acoustic-optic tunable filters, wavelength tunable optical switches, add-drop multiplexers and interferometric fiber sensors, and so on. There generally exists a cut-off wavelength in a conventional circularly symmetric single mode step index fiber. For an appropriate operating wavelength below the cut-off wavelength, two-mode operation can be achieved in such a conventional single-mode fiber. In addition, U.S. Pat. No. 4,832,437, entitled "Fiber Optic Inter-Mode Coupling Single Side Band Frequency Shifter" and issued on May 23, 1989, and U.S. Pat. No. 4,915,468, entitled "Apparatus Using Two-Mode Optical Waveguide with Non-Circular Core" and issued on Apr. 10, 1990, both assigned to The Board of Trustees of the Leland Stanford Junior University, discloses the two-mode applications using elliptical core optical fibers and is herein enclosed by reference.

However, disadvantages exist with the two-mode devices using conventional circular or elliptical core fibers in that these conventional fibers generally only support two-mode operation in a very limited wavelength range. To develop two-mode devices suitable for different operating wavelengths over a wider range, different two-mode fibers or fibers with different parameters are required. This inevitably increases the complexity of the fiber design and fabrication process.

OBJECT OF THE INVENTION

Therefore, it is an object of the present invention to provide an improved two-mode optical fiber with a relatively wider operating wavelength range and applications using the same, or at least provide the public with a useful choice.

SUMMARY OF THE INVENTION

According to an aspect of the present invention, a two-mode photonic crystal fiber includes a core of a substantially transparent core material. The core material has a core refractive index and a length, and has a core diameter.

The fiber also includes a cladding region surrounding the length of core material. The cladding region has a first substantially transparent cladding material, having a first refractive index. The first substantially transparent cladding material has embedded along its length a substantially periodic array of holes, having a diameter, d, and being spaced apart by a pitch, $\Lambda$. The holes have a second refractive index, which is less than the first refractive index. The dimensions of the hole diameter, d, and the pitch, $\Lambda$, co-operate to give two modes propagation within the photonic crystal fiber independent of input radiation wavelength for any value of the pitch, $\Lambda$, for a substantially fixed $d/\Lambda$ ratio within a range of approximately 0.45–0.65.

According to a second aspect of the present invention, a highly birefringent two-mode photonic crystal fiber includes:

a core of a substantially transparent core material, having a core refractive index and a length, and has a core diameter; and a cladding region surrounding the length of core material, wherein the cladding region includes a first substantially transparent cladding material, having a first refractive index, and wherein the first substantially transparent cladding material has embedded along its length a substantially periodic array of holes having a second refractive index which is less than the first refractive index, wherein the array of holes has at least two larger holes having a diameter, d2, and being arranged substantially symmetrical about a center axis of the photonic crystal fiber; and a plurality of smaller holes having a diameter, d1, and being spaced apart by a pitch, $\Lambda$, wherein d1 is smaller than d2, and wherein the dimensions of the smaller hole diameter, d1, the larger hole diameter d2, and the pitch, $\Lambda$, co-operate to give two modes propagation within the photonic crystal fiber independent of input radiation wavelength over an appropriate wavelength range, for a substantially fixed $d1/\Lambda$ ratio within a range of approximately 0.50–0.65.

According to a third aspect of the present invention, an interferometric sensor includes a highly birefringent two-mode photonic crystal fiber of a predetermined length, including a core of a substantially transparent core material, having a core refractive index and a length, and has a core diameter; and a cladding region surrounding the length of core material, wherein the cladding region includes a first substantially transparent cladding material, having a first refractive index, and wherein the first substantially transparent cladding material has embedded along its length a substantially periodic array of holes having a second refractive index which is less than the first refractive index, wherein the array of holes has at least two larger holes having a diameter, d2, and being arranged substantially symmetrical about a center axis of the photonic crystal fiber; and a plurality of smaller holes having a diameter, d1, and being spaced apart by a pitch, $\Lambda$, wherein d1 is smaller than d2, and wherein the dimensions of the smaller hole diameter, d1, the larger hole diameter d2, and the pitch, $\Lambda$, co-operate to give two modes propagation within the photonic crystal fiber independent of input radiation wavelength over an appropriate wavelength range, for a substantially fixed $d1/\Lambda$ ratio within a range of approximately 0.50–0.65;

a light source for introducing light into the photonic crystal fiber to propagate in the photonic crystal fiber in both of the fundamental and second order modes and in both of two polarizations within each of said modes, wherein interference between the two modes of each polarization or between two polarizations of each mode varies subject to external perturbation; and a detector for detecting the variance in an interference pattern of the light so as to ascertain the perturbation on the photonic crystal fiber.

According to a fourth aspect of the present invention, an optic frequency shifter for shifting the optical frequency of an optical signal from a first optical frequency to a second optical frequency includes a two-mode photonic crystal optical fiber, including
- a core of a substantially transparent core material, having a core refractive index and a length, and has a core diameter; and
- a cladding region surrounding the length of core material, wherein the cladding region includes a first substantially transparent cladding material, having a first refractive index, and wherein the first substantially transparent cladding material has embedded along its length a substantially periodic array of holes, having a diameter, d, and being spaced apart by a pitch, Λ, wherein the holes have a second refractive index which is less than the first refractive index;
- wherein the dimensions of the hole diameter, d, and the pitch, Λ, co-operate to give a fundamental and a second order modes propagation within the photonic crystal fiber independent of input radiation wavelength for any value of the pitch, Λ, for a substantially fixed d/Λ ratio within a range of approximately 0.45–0.65; and
- a generator, coupled to the fiber such that the transducer produces a flexural wave which propagates in the fiber, the flexural wave having a frequency, a propagation velocity and a wavelength, the wavelength of the flexural wave being a function of the frequency and the propagation velocity, and being selected to cause coupling of light from one of the fundamental and second order modes to the other of the fundamental and second order modes, wherein the light frequency in the coupled mode shifts by an amount that equals to the frequency of the acoustic flexural wave, and wherein the frequency of the uncoupled mode is not shifted.

According to a fifth aspect of the present invention, an optical frequency shifter for shifting the optical frequency of an optical signal from a first optical frequency to a second optical frequency includes a highly birefringent two-mode photonic crystal optical fiber, including
- a core of a substantially transparent core material, having a core refractive index and a length, and has a core diameter; and
- a cladding region surrounding the length of core material, wherein the cladding region includes a first substantially transparent cladding material, having a first refractive index, and wherein the first substantially transparent cladding material has embedded along its length a substantially periodic array of holes having a second refractive index which is less than the first refractive index,
- wherein the array of holes has
  - at least two larger holes having a diameter, d2, and being arranged substantially symmetrical about a center axis of the photonic crystal fiber; and
  - a plurality of smaller holes having a diameter, d1, and being spaced apart by a pitch, Λ, wherein d1 is smaller than d2,
- and wherein the dimensions of the smaller hole diameter, d1, the larger hole diameter d2, and the pitch, Λ, co-operate to give a fundamental and a second order modes propagation within the photonic crystal fiber independent of input radiation wavelength over an appropriate wavelength range, for a substantially fixed d1/Λ ratio within a range of approximately 0.50–0.65; and
- a generator, coupled to the fiber such that the transducer produces a flexural wave which propagates in the fiber, the flexural wave having a frequency, a propagation velocity and a wavelength, the wavelength of the flexural wave being a function of the frequency and the propagation velocity, and being selected to cause coupling of light from one of the fundamental and second order modes to the other of the fundamental and second order modes, wherein the light frequency in the coupled mode shifts by an amount that equals to the frequency of the acoustic flexural wave, and wherein the frequency of the uncoupled mode is not shifted.

According to a sixth aspect of the present invention, an optic wavelength filter for filtering an optical signal of at least two optical wavelengths includes a two-mode photonic crystal optical fiber, including
- a core of a substantially transparent core material, having a core refractive index and a length, and has a core diameter; and
- a cladding region surrounding the length of core material, wherein the cladding region includes a first substantially transparent cladding material, having a first refractive index, and wherein the first substantially transparent cladding material has embedded along its length a substantially periodic array of holes, having a diameter, d, and being spaced apart by a pitch, Λ, wherein the holes have a second refractive index which is less than the first refractive index;
- wherein the dimensions of the hole diameter, d, and the pitch, Λ, co-operate to give a fundamental and a second order modes propagation within the photonic crystal fiber independent of input radiation wavelength for any value of the pitch, Λ, for a substantially fixed d/Λ ratio within a range of approximately 0.45–0.65; and
- a generator, coupled to the fiber such that the transducer produces a flexural wave which propagates in the fiber, the flexural wave having a frequency, a propagation velocity and a wavelength, the wavelength of the flexural wave being a function of the frequency and the propagation velocity, and the wavelength of the flexural wave being selected to cause coupling of light from one of the fundamental and second order modes to the other of the fundamental and second order modes at a pre-selected wavelength, in which the wavelength of the flexural wave matches a modal beat length between the fundamental and second order modes, and thereby to generate light signals of the pre-selected wavelength in the other of the fundamental and second order modes at the output of the photonic crystal fiber.

According to a seventh aspect of the present invention, an optical wavelength filter for filtering an optical signal of at least two optical wavelengths includes a highly birefringent two-mode photonic crystal optical fiber, including
- a core of a substantially transparent core material, having a core refractive index and a length, and has a core diameter; and
- a cladding region surrounding the length of core material, wherein the cladding region includes a first substantially transparent cladding material, having a first refractive index, and wherein the first substantially transparent cladding material has embedded along its length a substantially periodic array of holes having a second refractive index which is less than the first refractive index, wherein the array of holes has at least two larger holes having a diameter, d2, and being arranged substantially symmetrical about a center axis of the photonic crystal fiber; and a plurality of smaller holes having a diameter, d1, and being spaced apart by a pitch, Λ, wherein d1 is smaller than d2, and wherein the dimensions of the smaller hole diameter, d1, the larger hole diameter d2, and the pitch, Λ, co-operate to give a fundamental and a second order modes propagation within the photonic crystal fiber independent of input radiation wavelength over an appropriate wavelength range, for a substantially fixed d1/Λ ratio within a range of approximately 0.50–0.65; and a generator, coupled to the fiber such that the transducer produces a flexural wave which propagates in the fiber, the flexural wave having a frequency, a propagation velocity and a wavelength, the wavelength of the flexural wave being a function of the frequency and the propagation velocity, and the wavelength of the flexural wave being selected to cause coupling of light from one of the fundamental and second order modes to the other of the fundamental and second order modes at a pre-selected wavelength, in which the wavelength of the flexural wave matches a modal beat length between the fundamental and second order modes, and thereby to generate light signals of the pre-selected wavelength in the other of the fundamental and second order modes at the output of the photonic crystal fiber.

According to an eighth aspect of the present invention, an optical wavelength tunable switch for switching light signals of at least a first and a second wavelength includes a two-mode photonic crystal optical fiber, including a core of a substantially transparent core material, having a core refractive index and a length, and has a core diameter; and a cladding region surrounding the length of core material, wherein the cladding region includes a first substantially transparent cladding material, having a first refractive index, and wherein the first substantially transparent cladding material has embedded along its length a substantially periodic array of holes, having a diameter, d, and being spaced apart by a pitch, Λ, wherein the holes have a second refractive index which is less than the first refractive index;

wherein the dimensions of the hole diameter, d, and the pitch, Λ, co-operate to give a fundamental and a second order modes propagation within the photonic crystal fiber independent of input radiation wavelength for any value of the pitch, Λ, for a substantially fixed d/Λ ratio within a range of approximately 0.45–0.65; and a generator, coupled to the fiber such that the transducer produces a flexural wave which propagates in the fiber, the flexural wave having a frequency, a propagation velocity and a wavelength, the wavelength of the flexural wave being a function of the frequency and the propagation velocity, and the wavelength of the flexural wave being selected to cause coupling of light from one of the fundamental and second order modes to the other of the fundamental and second order modes at a pre-selected wavelength, in which the wavelength of the flexural wave matches a modal beat length between the fundamental and second order modes, and thereby to generate light signals of the pre-selected wavelength in the other of the fundamental and second order modes at the output of the photonic crystal fiber.

According to a further aspect of the present invention, an optic wavelength tunable switch for switching light signals of at least a first and a second wavelength includes a highly birefringent two-mode photonic crystal optical fiber, including a core of a substantially transparent core material, having a core refractive index and a length, and has a core diameter; and a cladding region surrounding the length of core material, wherein the cladding region includes a first substantially transparent cladding material, having a first refractive index, and wherein the first substantially transparent cladding material has embedded along its length a substantially periodic array of holes having a second refractive index which is less than the first refractive index, wherein the array of holes has at least two larger holes having a diameter, d2, and being arranged substantially symmetrical about a center axis of the photonic crystal fiber; and a plurality of smaller holes having a diameter, d1, and being spaced apart by a pitch, Λ, wherein d1 is smaller than d2, and wherein the dimensions of the smaller hole diameter, d1, the larger hole diameter d2, and the pitch, Λ, co-operate to give a fundamental and a second order modes propagation within the photonic crystal fiber independent of input radiation wavelength over an appropriate wavelength range, for a substantially fixed d1/Λ ratio within a range of approximately 0.50–0.65; and a generator, coupled to the fiber such that the transducer produces a flexural wave which propagates in the fiber, the energy of the flexural wave confined to the optical fiber, the flexural wave having a frequency, a propagation velocity and a wavelength, the wavelength of the flexural wave being a function of the frequency and the propagation velocity, and the wavelength of the flexural wave being selected to cause coupling of light from one of the fundamental and second order modes to the other of the fundamental and second order modes at a pre-selected wavelength, in which the wavelength of the flexural wave matches a modal beat length between the fundamental and second order modes, and thereby to generate light signals of the pre-selected wavelength in the other of the fundamental and second order modes at the output of the photonic crystal fiber.

Other aspects and advantages of the invention will become apparent from the following detailed description, taken in conjunction with the accompanying drawings, which description illustrates by way of example the principles of the invention.

BRIEF DESCRIPTION OF THE DRAWINGS

FIG. 5b is a partially enlarged view of the fiber of FIG. 5a;

FIG. 8b illustrates the output spatial intensity distribution of the output of the photonic crystal fiber in FIG. 8a;

DETAILED DESCRIPTION

Figure 1:
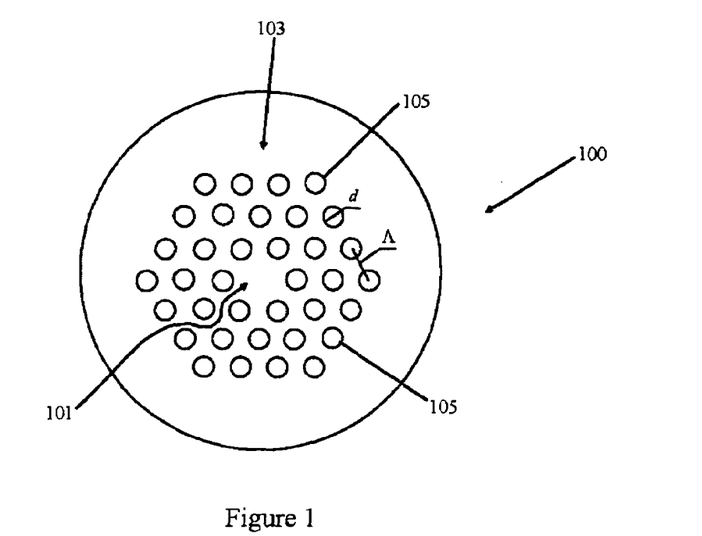
FIG. 1 is a cross section view of a two-mode photonic crystal optical fiber of an exemplary embodiment of the present invention.

FIG. 1 illustrates an index-guiding photonic crystal optical fiber 100 (hereinafter PCF). The PCF can be fabricated by stacking silica capillaries periodically in a hexagonal close packed array and replacing the central capillary with a solid silica rod of the same outer dimensions as generally understood in the art. The PCF 100 has a solid core 101 of a substantially transparent core material, having a core refractive index, n, and a length, l, and having a core diameter, of preferably at least 3 µm. The PCF 100 further includes a cladding region 103 surrounding the length of core material. The cladding region includes a first substantially transparent cladding material, having a first refractive index, and the first substantially transparent cladding material has embedded along its length a substantially periodic array of holes 105, having a diameter, d, and being spaced apart by a pitch, $\Lambda$. The holes 105 have a second refractive index, which is less than the first refractive index. Index-guiding photonic crystal optical fiber and its fabrication has been known in the art and have been disclosed in, for example, U.S. Pat. No. 6,334,019, entitled "Single Mode Optical Fiber," issued on Dec. 25, 2001 and assigned to The Secretary of State for Defence in Her Britannic Majesty's Government of the United Kingdom of Great Britain and Northern Ireland, and U.S. Pat. No. 6,603,912, entitled "Single Mode Optical Fiber Having a Large Cone Photonic Crystal," issued on Aug. 5, 2003 and assigned to Qinetiq Limited. Both are herein incorporated by reference.

Figure 2:
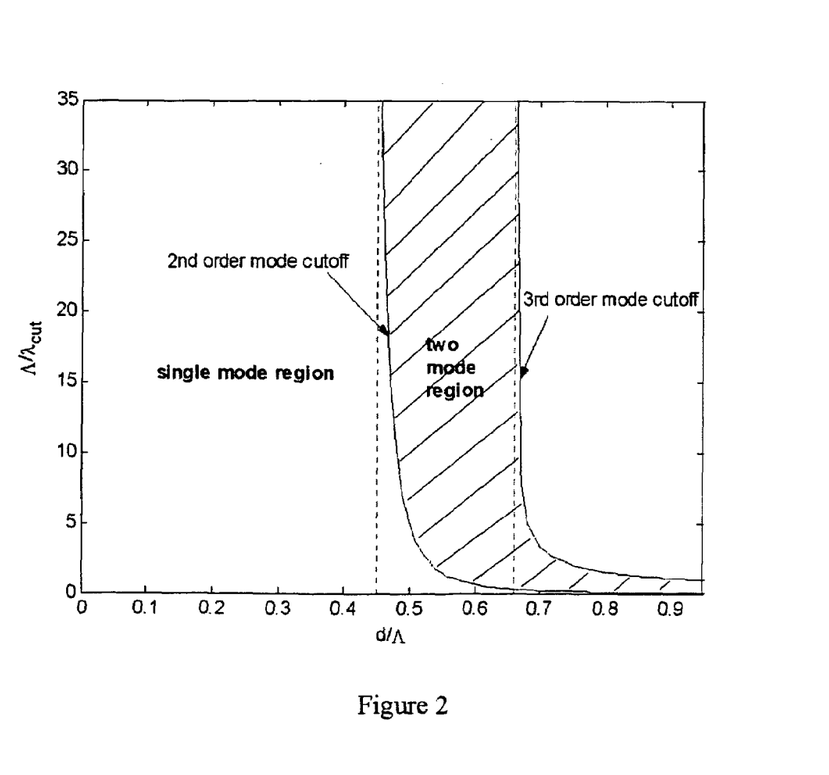
FIG. 2 is a schematic representation of $\Lambda/\lambda_{cut}$–$d/\Lambda$ plot illustrating the two-mode operating region of the photonic crystal fiber of FIG. 1.
Figure 3A:
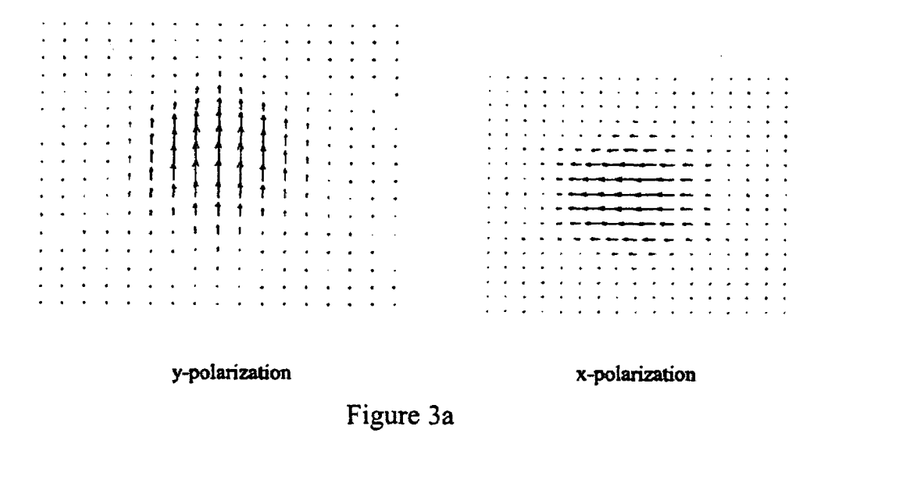
FIGS. 3a and 3b illustrate the mode field patterns of the optical signals propagated in the photonic crystal fiber of FIG. 1.
Figure 3B:
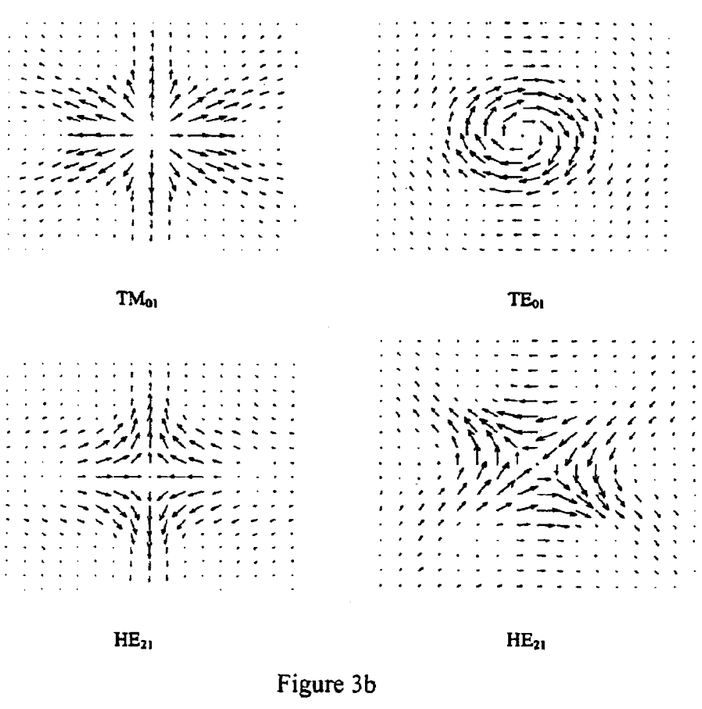

In the exemplary embodiment of FIG. 1, the d/$\Lambda$ ratio is designed to fall in a range of 0.45–0.65 as shown in FIG. 2. In this way, the PCF 100 supports two modes propagation therein, i.e., a fundamental mode and a second order mode, independent of the input radiation wavelength for any value of the pitch, $\Lambda$, for a substantially fixed d/$\Lambda$ ratio within the range of 0.45–0.65. For the purpose of illustration, the mode field patterns of these modes are shown in FIG. 3. In FIG. 3(a), the mode fields of the two polarizations of the fundamental mode are shown. By analogy to the conventional step index fiber, the fundamental mode is referred to as $LP_{01}$ in the present application. In FIG. 3b, the model fields of the four second order hybrid modes are shown. Similarly to the conventional circular fiber, these four modes are approximately degenerated and are referred to as $LP_{11}$ in the present application.

In the exemplary embodiment of FIG. 1, for a particular PCF with d/$\Lambda$ ratio within the range of 0.45–0.65, the two-mode operation wavelength $\lambda$ is decided by the cut off wavelength $\lambda_{cut}$ of the second order hybrid $LP_{11}$, specifically, $\lambda < \lambda_{cut}$. In FIG. 2, $\lambda_{cut}$ is represented by the boundary between the single mode and the two-mode regions. For example, for d/$\Lambda$=0.55, the PCF 100 supports the fundamental $LP_{01}$ and the second order hybrid $LP_{11}$ mode for the optical signals of a wavelength that satisfies $\Lambda/\lambda > \Lambda/\lambda_{cut}$=1.6, or $\lambda < \lambda_{cut}$=$\Lambda/1.6$. In a case that the pitch $\Lambda$ is chosen to be 3 µm, the PCF 100 supports the two modes, i.e., $LP_{01}$ and $LP_{11}$ for all the wavelengths less than $\lambda_{cut}$=1.9 µm. In a case that the pitch $\Lambda$ is chosen to be 5 µm, for the same d/$\Lambda$=0.55, the PCF 100 supports the two modes, i.e., $LP_{01}$ and $LP_{11}$ for all the wavelengths less than $\lambda_{cut}$=3.1 µm. In short, for a fixed d/$\Lambda$ ratio within the range of 0.45–0.65, the PCF supports two modes propagation within the PCF for any input radiation wavelength less than $\lambda_{cut}$ for any value of the pitch, $\Lambda$. Thereby, this embodiment achieves two-mode operation for a wide range of operating wavelength.

Figure 4:
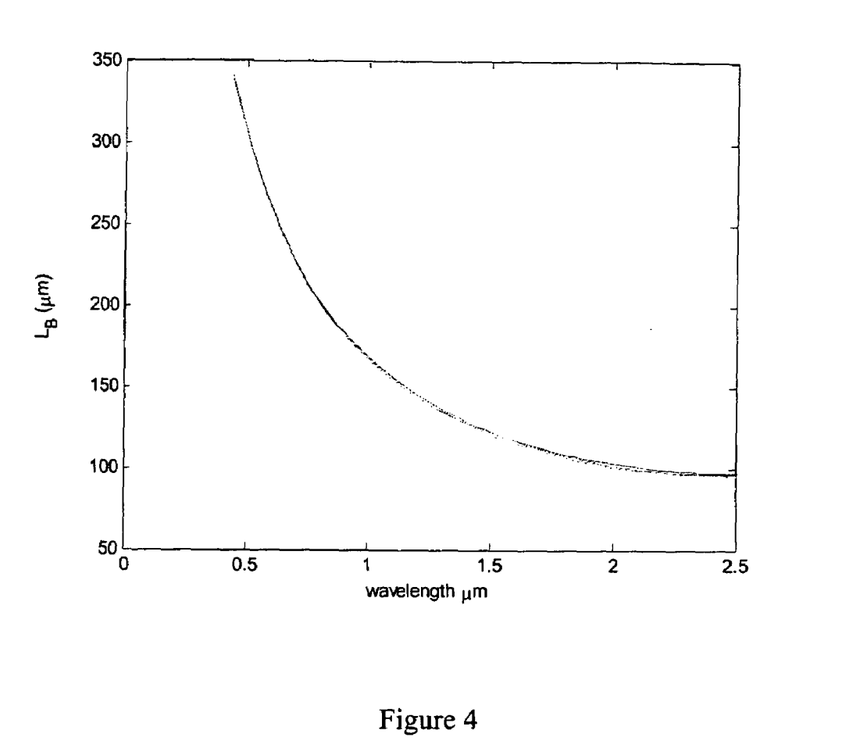
FIG. 4 illustrates the beat lengths between the fundamental and the second order modes of the photonic crystal fiber of FIG. 1.

FIG. 4 shows the beat lengths between the four second order modes and the fundamental mode, which beat length is defined as the length of a fiber over which the phase difference between the specified two modes changes by $2\pi$. The four curves are very close to each other. This indicates approximately degenerated nature of the four second order modes.

Figure 5A:
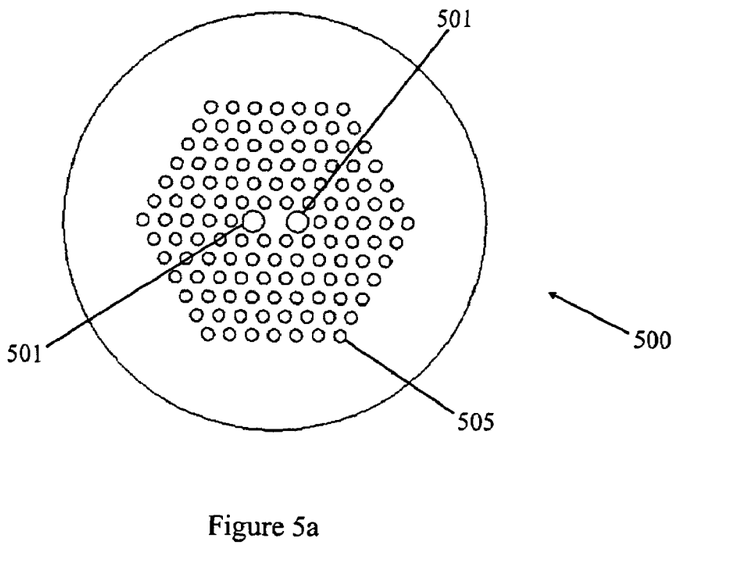
FIG. 5a is a cross-sectional view of a second embodiment of the photonic crystal fiber of the present invention.
Figure 5B:
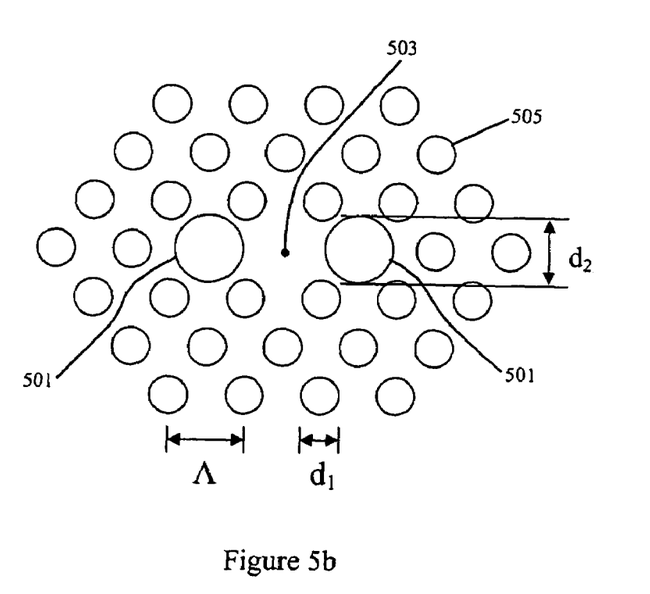
Figure 6A:
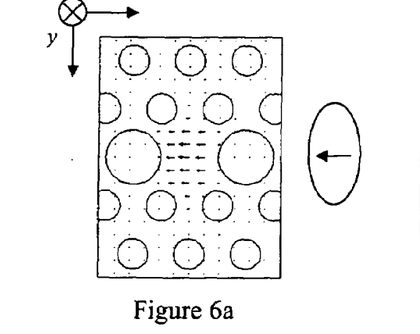
FIGS. 6a–6d illustrate the mode field patterns of the optical signals propagated in the photonic crystal fiber of FIGS. 5a and 5b.
Figure 6B:
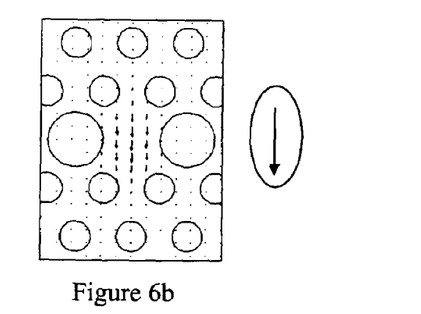
Figure 6C:
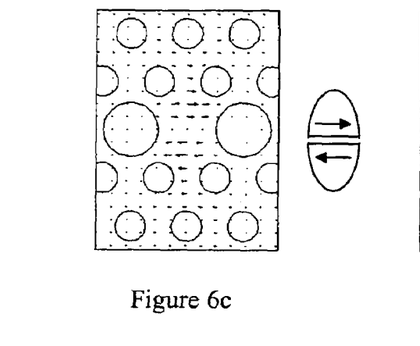
Figure 6D:
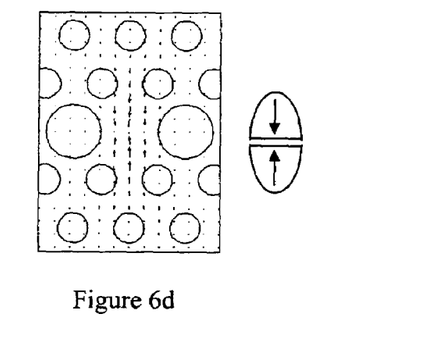

FIGS. 5a and 5b illustrate another exemplary PCF 500, which has a pair of larger holes 501 approximately symmetrical to a center axis 503 of the PCF. The larger holes 501 have a diameter d2, larger than the one, d1, of the smaller holes 505. The pitch, $\Lambda$, is defined as the spacing between two adjacent smaller holes 505.

In an exemplary example, the d1/$\Lambda$ ratio is designed to fall in a range of 0.5–0.65 and cooperates with d2 and $\Lambda$ such that PCF 500 supports two modes i.e., the fundamental mode $LP_{01}$ and the second order mode $LP_{11}$, propagation therein over an appropriate operating wavelength range. As d2 has a value close to d1, the hybrid $LP_{11}$ is comprised of four modes similar to the PCF of FIG. 1. As d2 increases, the PCF become highly birefringent and the number and field patterns of the modes that forms the hybrid second order LP11 mode reduce. When the d2/$\Lambda$ falls in a range of approximately 0.9–1.2, the hybrid second order $LP_{11}$ mode is only comprised of, for appropriate wavelength range, two modes that are approximately linearly and orthogonally polarized along either x- or y-direction, as shown in FIG. 6. These modes have well defined, stable lope orientations along the y-direction as shown in FIG. 6 and are referred to as LP11 (even) mode.

In a second exemplary example, the $d1/\Lambda$ ratio falls within a range of approximately 0.5–0.65, the $d2/\Lambda$ ratio falls within a range of approximately 0.9–1.2, and the $\Lambda$ falls within a range of approximately 4–7 µm. In this example, the highly birefringent PCF support two modes over an input radiation wavelength range, which is within a broader range of 500 nm–2000 nm, depending on the exact values of $d1/\Lambda$, $d2/\Lambda$ and $\Lambda$. In addition, in a third example, the range of $\Lambda$ is selected to exclude the range of 4.18–4.4 µm.

In yet another exemplary example, the $d1/\Lambda$ ratio falls within a range of approximately 0.52–0.54, the $d2/\Lambda$ ratio falls within a range of approximately 0.97–1.2, and the $\Lambda$ falls within a range of approximately 5.5–6 µm. In this example, the highly birefringent PCF support two modes over an input radiation wavelength within a range of 600 nm–2000 nm.

INDUSTRIAL APPLICABILITY

1. Interferometric Sensors

Figure 8A:
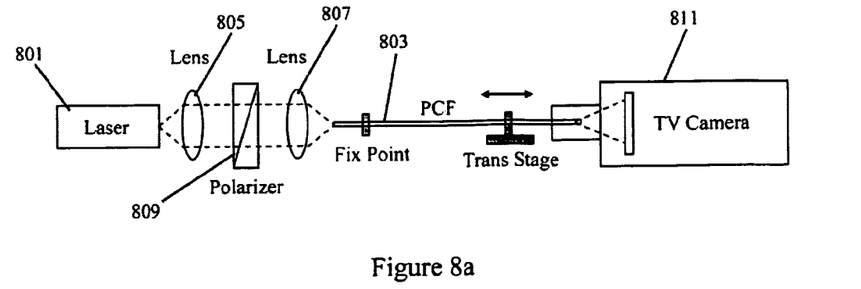
FIG. 8a is a schematic diagram illustrating an interferometric sensor, in which the photonic crystal fiber of FIGS. 5a and 5b can be used.
Figure 8B:
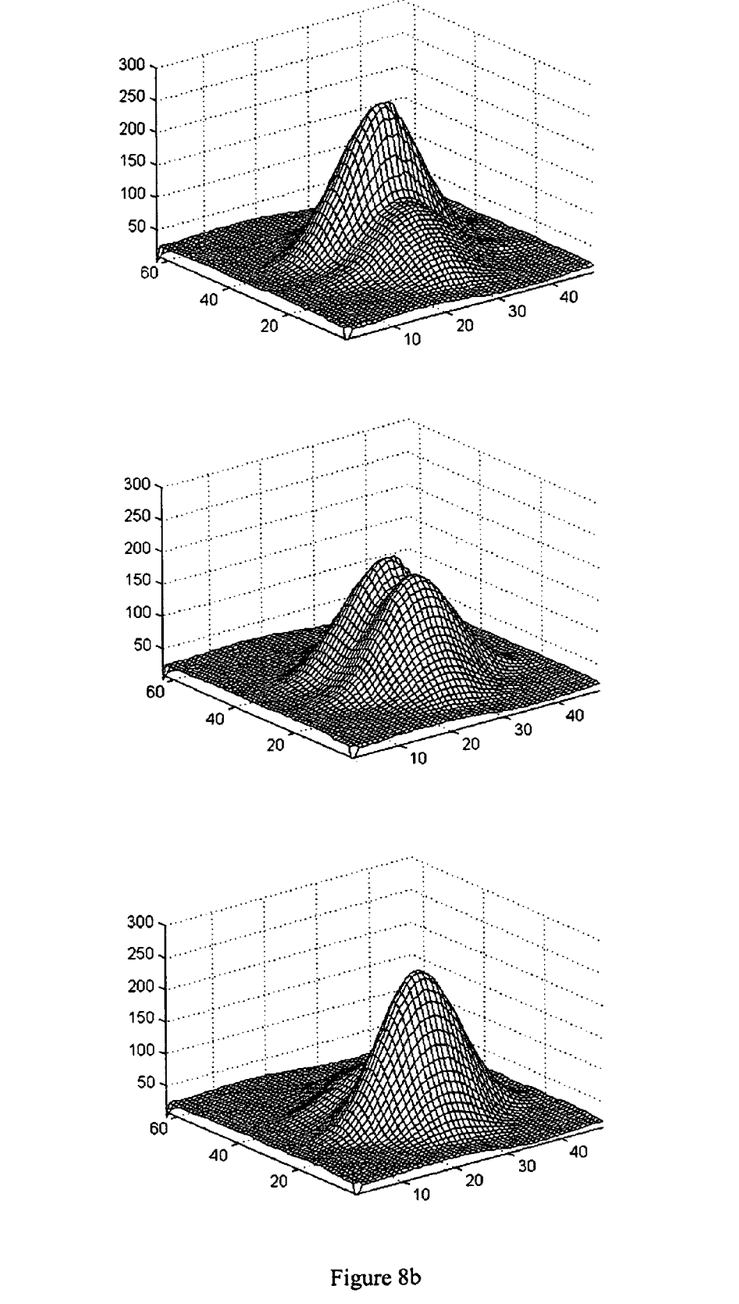
Figure 8C:
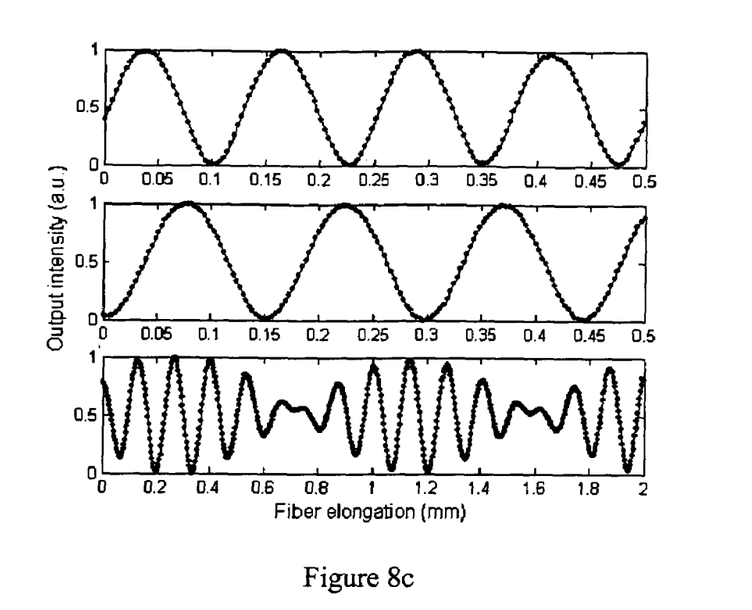
FIG. 8c illustrates the intensity variation around a peak of the intensity distribution pattern of FIG. 8b, with an applied strain for three different input polarization directions.
Figure 8D:
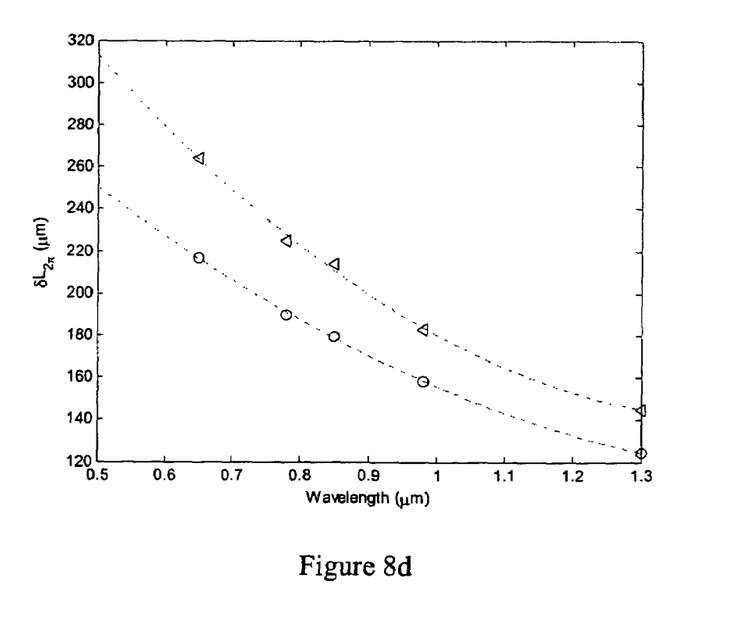
FIG. 8d illustrates the elongation required to produce $2\pi$ phase change between the two modes, in which the circle represents x-polarization and the triangle represents y-polarization.

Such interferometric sensors may include strain sensors, temperature sensors, and sensors for measuring both. FIG. 8a illustrates a schematic diagram of a strain sensor using a two-mode high briefringent PCF of FIGS. 5a and 5b. Light from a laser 801 or other light source is coupled into the PCF 803 through a launching system having a pair of lens 805, 807 and a polarizer 809. The focused beam is slightly offset from the center of the PCF 803 to excite the fundamental $LP_{01}$ and the second $LP_{11}$ (even) approximately equal in intensity. As understood in the art, lights propagate in both polarizations within each mode and interferences occur between the two modes of each polarization or between two polarizations of each mode. Such interferences vary subject to external perturbation. An infrared camera 811, positioned adjacent the output of the PCF, monitors the interference patterns from the PCF 803. FIG. 8b shows the intensity distribution for phase difference between the two modes of $\Delta\phi=2m\pi$, $\Delta\phi=2m\pi+\pi/2$ and $\Delta\phi=2\ m\pi+\pi$ (m=0, 1, 2, . . . ). Any applied strain or temperature variance the PCF 803 suffers will cause the phase difference $\Delta\phi$ to vary and hence the interference pattern(s) of the output. FIG. 8c shows the variation of the output light intensity at a place near one of the peaks 813 shown in FIG. 8b as a result under the applied strain. The three curves shown in FIG. 8c from top to bottom respectively correspond to the scenarios, in which the polarizer 809 is aligned to x-axis, y-axis and 45 degree respective to x-axis. FIG. 8d illustrates measurement of the strain sensitivity for a particular two-mode high birefringent PCF with respect to the strain required to produce $2\pi$ phase shift between the two modes ($LP_{01}$ and $LP_{11}$ (even)). The two curves marked with circles and triangles correspond to the x and y polarizations respectively.

Alternatives can be made. For example, a lead-in fiber, which is offset aligned to the PCF 803, can be used to replace the launching system to excite approximately equally the two modes. A lead-out fiber can be connected to the output of the PCF 803 for collection of part of lights from both modes, and the interference induced output intensity variation is detected or monitored through the lead-out fiber by a photo-detector. In this case, the lead-out fiber is also offset aligned to the center of the PCF. Furthermore, in both cases, the lead-in and lead-out fibers are single mode at the operating wavelength, or alternatively, can be endlessly single mode PCF that is single mode for all operating wavelength. The lead-in and lead-out fibers can also be single mode polarization maintaining fibers at the operating wavelength or endlessly single mode polarization maintaining PCFs.

2. Acousto-Optic Frequency Shifter

Acousto-optic frequency shifter can be built based on coupling of the fundamental and the second order spatial modes by traveling micro-bending due to acoustic wave propagation within the fiber as generally understood in the art. This has been disclosed by the '437 and '468 patents, which are incorporated in this application by reference.

Figure 9:
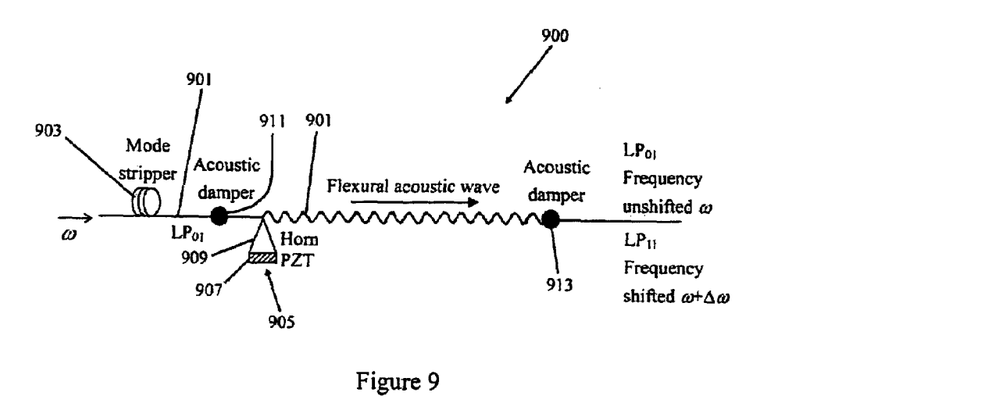
FIG. 9 is a schematic diagram of an acousto-optic frequency shifter, in which the photonic crystal fiber of FIG. 1 or 5a can be used.

In an exemplary acousto-optic frequency shifter 900 of FIG. 9, input light at frequency ω typically excites both fundamental mode $LP_{01}$ and the second order mode $LP_{11}$ within the two-mode PCF 901, which can be the PCF of FIG. 1 or 5a. A mode stripper 903, formed for example by a tight bend, removes the second order mode and leaves only $LP_{01}$ mode to continue propagating along the two-mode PCF 901. An acousto-optic transducer 905 having a PZT 907 and an acoustic horn 909 excites flexural acoustic waves that result in traveling micro bend and thereby cause power coupling from the fundamental $LP_{01}$ to the second order $LP_{11}$ mode if the acoustic wavelength matches the beat length between the two modes at the operating wavelength. Furthermore, as understood in the art, the light in the second order $LP_{11}$ mode is of an optical frequency sifted from the input optical frequency by the frequency of the acoustic wave.

Figure 10:
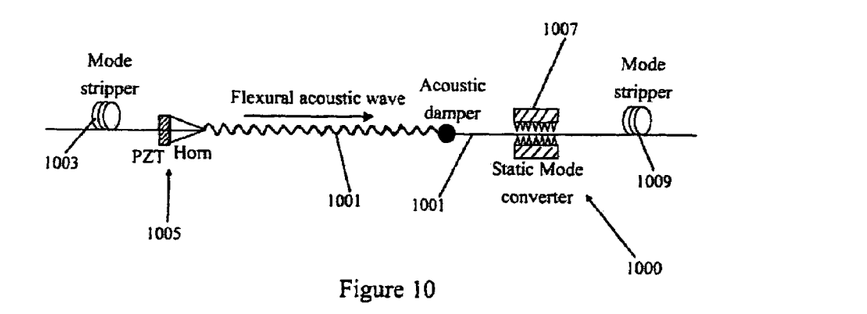
FIG. 10 is a schematic diagram of an acousto-optic tunable optic filter, in which the photonic crystal fiber of FIG. 1 or 5a can be used.

In the exemplary embodiment of FIG. 9, the horn 909 is orthogonal to the longitudinal axis of the PCF 901 and produces longitudinal acoustic waves at the horn tip. Alternatively, the horn can be coaxial to the fiber 901 and works on a shear mode to excite the flexural waves in the fiber as shown in FIG. 10.

A pair of acoustic dampers 911, 913 is used to limit the flexural waves within a specific interaction region therebetween. At the output of the PCF 901, the light has a frequency-shifted component of $LP_{11}$ mode and a remaining un-shifted component of $LP_{01}$ mode. As known in the art, the relative magnitude of the two components depends on the coupling efficiency, which is affected by several factors such as fiber characteristics, operating wavelength, acousto-optic interaction length, and the magnitude and frequency of the flexural acoustic wave. By controlling the magnitude of the excitation acoustic wave, a selected percentage, from 0 to 100%, of light power can be coupled, at a particular operating wavelength, from the of $LP_{01}$ mode to the $LP_{11}$ mode. A mode selector (not shown) can be used to separate the frequency-shifted and frequency-un-shifted components.

By using the two-mode PCF of the present application, the frequency shifter 900 can have a much larger operating wavelength range with designable mode field areas as compared to conventional designs.

3. Acousto-Optic Tunable Filter

The frequency shifter 900 of FIG. 9 can be further developed into a tunable optic filter 1000 as shown in FIG. 10. Similarly to the frequency shifter of FIG. 9, the tunable optic filter 1000 also has a mode stripper 1003 and an acousto-optic transducer 1005, which function similar to the ones of FIG. 9 respectively. The acousto-optic transducer 1005 controls the magnitude of the acoustic wave generated such that almost 100% of the light power is coupled from the $LP_{01}$ mode to the $LP_{11}$ mode at a pre-selected optical wavelength, in which the modal beat length is matched to the acoustic flexural wave. A static mode converter 1007 converts the $LP_{11}$ mode to the $LP_{01}$ mode in a relatively broad wavelength range, and another mode stripper 1009 removes the remaining unwanted light in the $LP_{11}$ mode. In this way, an optical bandpass filter is formed.

Figure 7:
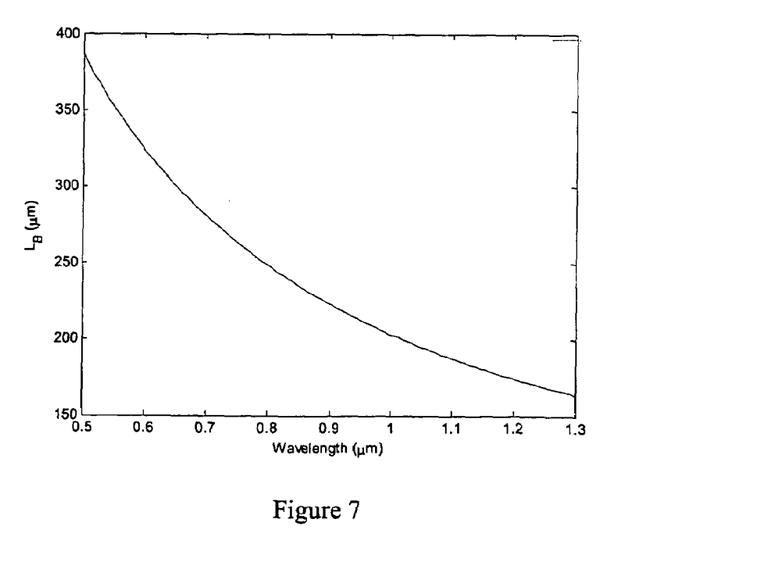
FIG. 7 illustrates the beat lengths between the fundamental and the second order modes for one polarization of the photonic crystal fiber of FIGS. 5a and 5b.

Since the modal beat length is a single-valued function of the wavelength over a very broad wavelength range as illustrated in FIGS. 4 and 7, varying the acoustic-frequency will shift the center wavelength of the filter. Thereby, a tunable filter can be realized.

In addition, the bandpass filter 1000 can be converted to a band-rejection filter by removing the static mode converter 1007. In can also be understood that the pre-selected wavelength can be tuned by tuning the frequency of the acoustic flexural wave.

The use of the two-mode PCF offers a much larger operating wavelength range or tuning range for the acousto-optic filter, and with a mode field area designable so as to allow low loss coupling to other fibers or waveguides.

4. Acousto-Optic Wavelength Tunable Switch

Figure 11:
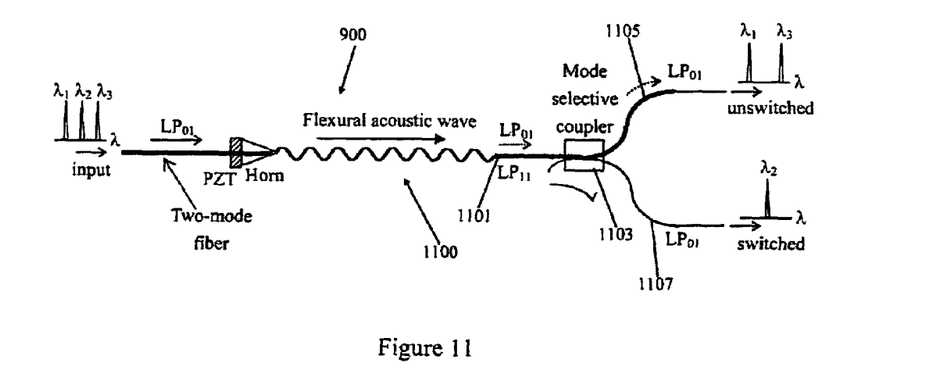
FIG. 11 is a schematic diagram of an acousto-optic wavelength tunable switch, in which the photonic crystal fiber of FIG. 1 or 5a can be used.

In FIG. 11, an acousto-optic wavelength tunable switch 1100 is formed by combining the acousto-optic frequency shifter 900 of FIG. 9 with a mode selective coupler 1103, which is coupled to the output of the PCF 1101 in frequency shifter 900. At the input end, a mode stripper (not shown in FIG. 11) removes the $LP_{11}$ mode. Due to the wavelength dependence of the modal beat length, at a particular acoustic frequency, only one optical wavelength, for example, $\lambda_2$, with its modal beat length matched to the wavelength of the acoustic flexural wave is coupled from the $LP_{01}$ mode to the $LP_{11}$ mode. At the mode selective coupler 1103, the light component in $LP_{01}$ mode is still guided in the $LP_{01}$ mode to propagate in a two-mode fiber 1105, while the light component in $LP_{11}$ mode is coupled to the fundamental $LP_{01}$ mode of a single mode fiber 1107. By controlling the frequency of the acoustic wave, each individual wavelength component can be selectively coupled or switched to the single mode fiber 1107.

It can be understood that the wavelength at which light couples from one spatial mode to the other can be controlled by the frequency of acoustic flexural wave.

What is claimed is:

1. A two-mode highly briefringent photonic crystal fiber, comprising:
a core of a substantially transparent core material, having a core refractive index and a length, and has a core diameter; and
a cladding region surrounding the length of core material, wherein the cladding region includes a first substantially transparent cladding material, having a first refractive index, and wherein the first substantially transparent cladding material has embedded along its length a substantially periodic array of holes having a second refractive index which is less than the first refractive index,
wherein the array of holes has
at least two larger holes having a diameter, d2, and being arranged substantially symmetrical about a center axis of the photonic crystal fiber; and
a plurality of smaller holes having a diameter, d1, and being spaced apart by a pitch, $\Lambda$, wherein d1 is smaller than d2,
and wherein the dimensions of the smaller hole diameter, d1, the larger hole diameter d2, and the pitch, $\Lambda$, co-operate to give two modes propagation within the photonic crystal fiber independent of input radiation wavelength over an appropriate wavelength range, for a substantially fixed d1/$\Lambda$ ratio within a range of approximately 0.5–0.65.

2. The photonic crystal fiber of claim 1, wherein the d2/$\Lambda$ ratio falls within a range of approximately 0.9–1.2.

3. The photonic crystal fiber of claim 2, wherein the $\Lambda$ falls within a range of approximately 4–7 µm.

4. The photonic crystal fiber of claim 3, wherein the range of $\Lambda$ excludes the range of 4.18–4.4 µm.

5. The photonic crystal fiber of claim 1, wherein the d1/$\Lambda$ ratio falls within a range of approximately 0.52–0.54.

6. The photonic crystal fiber of claim 5, wherein the d2/$\Lambda$ ratio falls within a range of approximately 0.97–1.2.

7. The photonic crystal fiber of claim 6, wherein the $\Lambda$ falls within a range of approximately 5.5–6 µm.

8. The photonic crystal fiber of claim 7, wherein the input radiation wavelength falls within a range of 600 nm–2000 nm.

9. An interferometric sensor, comprising
a highly birefringent two-mode photonic crystal fiber of a predetermined length, including
a core of a substantially transparent core material, having a core refractive index and a length, and has a core diameter; and
a cladding region surrounding the length of core material, wherein the cladding region includes a first substantially transparent cladding material, having a first refractive index, and wherein the first substantially transparent cladding material has embedded along its length a substantially periodic array of holes having a second refractive index which is less than the first refractive index,
wherein the array of holes has
at least two larger holes having a diameter, d2, and being arranged substantially symmetrical about a center axis of the photonic crystal fiber; and
a plurality of smaller holes having a diameter, d1, and being spaced apart by a pitch, $\Lambda$, wherein d1 is smaller than d2,
and wherein the dimensions of the smaller hole diameter, d1, the larger hole diameter d2, and the pitch, $\Lambda$, co-operate to give two modes propagation within the photonic crystal fiber independent of input radiation wavelength over an appropriate wavelength range, for a substantially fixed d1/$\Lambda$ ratio within a range of approximately 0.50–0.65;
a light source for introducing light into the photonic crystal fiber to propagate in the photonic crystal fiber in both of the fundamental and second order modes and in both of two polarizations within each of said mode, wherein interference between the two modes of each polarization or between two polarizations of each mode varies subject to external perturbation; and
a detector for detecting the variance in an interference pattern of the light so as to ascertain the perturbation on the photonic crystal fiber.

10. The apparatus of claim 9, wherein the perturbation is a strain applied to the photonic crystal fiber that causes the length of the photonic crystal fiber to change.

11. The apparatus of claim 10, wherein the intensity of the light varies in response to changes in the temperature of the photonic crystal fiber, the variations in intensity caused by changes in the temperature differing from the variations in intensity caused by strain, the apparatus further including means for processing said first and second output signals to determine the magnitude of the strain and the magnitude of the temperature change.

12. The photonic crystal fiber of claim 9, wherein the d1/Λ ratio falls within a range of approximately 0.52–0.54.

13. The photonic crystal fiber of claim 12, wherein the d2/Λ ratio falls within a range of approximately 0.97–1.2.

14. The photonic crystal fiber of claim 13, wherein the Λ falls within a range of approximately 5.5–6 μm.

15. The photonic crystal fiber of claim 14, wherein the input radiation wavelength falls within a range of 600 nm–2000 nm.

16. The photonic crystal fiber of claim 9, wherein the range of Λ excludes the range of 4.18–4.4 μm.

17. An optic frequency shifter for shifting the optical frequency of an optical signal from a first optical frequency to a second optical frequency, comprising
   a highly birefringent two-mode photonic crystal optical fiber, including
      a core of a substantially transparent core material, having a core refractive index and a length, and has a core diameter; and
      a cladding region surrounding the length of core material, wherein the cladding region includes a first substantially transparent cladding material, having a first refractive index, and wherein the first substantially transparent cladding material has embedded along its length a substantially periodic array of holes having a second refractive index which is less than the first refractive index,
      wherein the array of holes has
         at least two larger holes having a diameter, d2, and being arranged substantially symmetrical about a center axis of the photonic crystal fiber; and
         a plurality of smaller holes having a diameter, d1, and being spaced apart by a pitch, Λ, wherein d1 is smaller than d2,
      and wherein the dimensions of the smaller hole diameter, d1, the larger hole diameter d2, and the pitch, Λ, co-operate to give a fundamental and a second order modes propagation within the photonic crystal fiber independent of input radiation wavelength over an appropriate wavelength range, for a substantially fixed d1/Λ ratio within a range of approximately 0.50–0.65; and
   a generator, coupled to the fiber such that the transducer produces a flexural wave which propagates in the fiber, the flexural wave having a frequency, a propagation velocity and a wavelength, the wavelength of the flexural wave being a function of the frequency and the propagation velocity, and being selected to cause coupling of light from one of the fundamental and second order modes to the other of the fundamental and second order modes, wherein the light frequency in the coupled mode shifts by an amount that equals to the frequency of the acoustic flexural wave, and wherein the frequency of the uncoupled mode is not shifted.

18. The optic frequency shifter of claim 17, further comprising a light source for introducing light signals of the first optical frequency into the photonic crystal fiber, and a mode stripper built along the fiber before the generator in a direction, in which the lights propagates, for removing one of the fundamental and second order modes.

19. The optic frequency shifter of claim 17, wherein the generator includes an acousto-optic transducer coupled to the photonic crystal fiber for generating an acoustic wave having an acoustic frequency equal to the difference between said first optical frequency and the second optical frequency.

20. The optic frequency shifter of claim 17, further comprising a mode selector optically coupled to the output of the photonic crystal fiber for selectively outputting light signals of the second optical frequency.

21. The photonic crystal fiber of claim 17, wherein the d1/Λ ratio falls within a range of approximately 0.52–0.54.

22. The photonic crystal fiber of claim 21, wherein the d2/Λ ratio falls within a range of approximately 0.97–1.2.

23. The photonic crystal fiber of claim 22, wherein the Λ falls within a range of approximately 5.5–6 μm.

24. The photonic crystal fiber of claim 23, wherein the input radiation wavelength falls within a range of 600 nm–2000 nm.

25. The photonic crystal fiber of claim 17, wherein the range of Λ excludes the range of 4.18–4.4 μm.

26. An optical wavelength filter for filtering an optical signal of at least two optical wavelengths, comprising
   a highly birefringent two-mode photonic crystal optical fiber, including
      a core of a substantially transparent core material, having a core refractive index and a length, and has a core diameter; and
      a cladding region surrounding the length of core material, wherein the cladding region includes a first substantially transparent cladding material, having a first refractive index, and wherein the first substantially transparent cladding material has embedded along its length a substantially periodic array of holes having a second refractive index which is less than the first refractive index,
      wherein the array of holes has
         at least two larger holes having a diameter, d2, and being arranged substantially symmetrical about a center axis of the photonic crystal fiber; and
         a plurality of smaller holes having a diameter, d1, and being spaced apart by a pitch, Λ, wherein d1 is smaller than d2,
      and wherein the dimensions of the smaller hole diameter, d1, the larger hole diameter d2, and the pitch, Λ, co-operate to give a fundamental and a second order modes propagation within the photonic crystal fiber independent of input radiation wavelength over an appropriate wavelength range, for a substantially fixed d1/Λ ratio within a range of approximately 0.50–0.65; and
   a generator, coupled to the fiber such that the transducer produces a flexural wave which propagates in the fiber, the flexural wave having a frequency, a propagation velocity and a wavelength, the wavelength of the flexural wave being a function of the frequency and the propagation velocity, and the wavelength of the flexural wave being selected to cause coupling of light from one of the fundamental and second order modes to the other of the fundamental and second order modes at a pre-selected wavelength, in which the wavelength of the flexural wave matches a modal beat length between the fundamental and second order modes, and thereby to generate light signals of the pre-selected wavelength in the other of the fundamental and second order modes at the output of the photonic crystal fiber.

27. The optical wavelength filter of claim 26, further comprising a light source for introducing light signals of the first optical frequency into the photonic crystal fiber, and a mode stripper built along the fiber before the generator in a direction, in which the lights propagates, for removing one of the fundamental and second order modes.

28. The optical wavelength filter of claim 26, wherein the generator includes an acousto-optic transducer coupled to the photonic crystal fiber for generating an acoustic wave having an acoustic frequency equal to the difference between said first optical frequency and the second optical frequency.

29. The optical wavelength filter of claim 26, further comprising a mode selector optically coupled to the output of the photonic crystal fiber for selectively outputting light signals of the second optical frequency.

30. The optical wavelength filter of claim 26, further comprising a static mode converter optically coupled to the output of the photonic crystal fiber for switching the modes of the light signals.

31. The optical wavelength filter of claim 30, further comprising a mode stripper optically coupled to the static mode converter for selectively outputting light signals of the pre-selected wavelength.

32. An optic wavelength tunable switch for switching light signals of at least a first and a second wavelength, comprising
   a highly birefringent two-mode photonic crystal optical fiber, including
      a core of a substantially transparent core material, having a core refractive index and a length, and has a core diameter; and
      a cladding region surrounding the length of core material, wherein the cladding region includes a first substantially transparent cladding material, having a first refractive index, and wherein the first substantially transparent cladding material has embedded along its length a substantially periodic array of holes having a second refractive index which is less than the first refractive index,
   wherein the array of holes has
      at least two larger holes having a diameter, d2, and being arranged substantially symmetrical about a center axis of the photonic crystal fiber; and
      a plurality of smaller holes having a diameter, d1, and being spaced apart by a pitch, Λ, wherein d1 is smaller than d2,
   and wherein the dimensions of the smaller hole diameter, d1, the larger hole diameter d2, and the pitch, Λ, co-operate to give a fundamental and a second order modes propagation within the photonic crystal fiber independent of input radiation wavelength over an appropriate wavelength range, for a substantially fixed d1/Λ ratio within a range of approximately 0.50–0.65; and
   a generator, coupled to the fiber such that the transducer produces a flexural wave which propagates in the fiber, the flexural wave having a frequency, a propagation velocity and a wavelength, the wavelength of the flexural wave being a function of the frequency and the propagation velocity, and the wavelength of the flexural wave being selected to cause coupling of light from one of the fundamental and second order modes to the other of the fundamental and second order modes at a pre-selected wavelength, in which the wavelength of the flexural wave matches a modal beat length between the fundamental and second order modes, and thereby to generate light signals of the pre-selected wavelength in the other of the fundamental and second order modes at the output of the photonic crystal fiber.

33. The optic wavelength tunable switch of claim 32, further comprising a light source for introducing light signals of the first optical frequency into the photonic crystal fiber, and a mode stripper built along the fiber before the generator in a direction, in which the lights propagates, for removing one of the fundamental and second order modes.

34. The optic wavelength tunable switch of claim 32, wherein the generator includes an acousto-optic transducer coupled to the photonic crystal fiber for generating an acoustic wave having an acoustic frequency equal to the difference between said first optical frequency and the second optical frequency.

35. The wavelength tunable switch of claim 32, further comprising a mode selective coupler for directing the light signals in two directions dependent upon the mode of the light signals.

* * * * *